US012641481B2

(12) United States Patent
Uniyal

(10) Patent No.: US 12,641,481 B2
(45) Date of Patent: May 26, 2026

(54) SIGNALING STORM MITIGATION

(71) Applicant: Boost SubscriberCo L.L.C.,
Englewood, CO (US)

(72) Inventor: Manish Uniyal, Parker, CO (US)

(73) Assignee: Boost SubscriberCo L.L.C.,
Englewood, CO (US)

( * ) Notice: Subject to any disclaimer, the term of this
patent is extended or adjusted under 35
U.S.C. 154(b) by 0 days.

(21) Appl. No.: 18/677,396

(22) Filed: May 29, 2024

(65) Prior Publication Data

US 2025/0374120 A1 Dec. 4, 2025

(51) Int. Cl.
*H04W 28/02* (2009.01)

(52) U.S. Cl.
CPC ............................... *H04W 28/0289* (2013.01)

(58) Field of Classification Search
CPC .................................................. H04W 28/0289
USPC .......................................................... 709/238
See application file for complete search history.

(56) References Cited

U.S. PATENT DOCUMENTS 11,570,627 B1 * 1/2023 Montalvo ............. H04W 24/10

2022/0303796 A1 * 9/2022 Zhang ..................... H04L 41/14
2023/0239710 A1 * 7/2023 Song ..................... H04W 92/12
455/422.1
2024/0298252 A1 * 9/2024 Sharma ................. H04W 48/18

OTHER PUBLICATIONS

Eventhelix.com [online], "5G Standalone Access: Registration Pro-
cedure," Feb. 2019, retrieved on Aug. 27, 2024, retrieved from
URL<https://www.eventhelix.com/5g/standalone-access-registration/
5g-standalone-access-registration.pdf>, 7 pages.
O-ran.org [online], "O-Ran Alliance Introduces 33 New Specifica-
tions Released Since Mar. 2021," available on or before May 26,
2022, via Internet Archive: Wayback Machine URL<https://web.
archive.org/web/20220526134536/https://www.o-ran.org/blog/o-ran-
alliance-introduces-33-new-specifications-released-since-march-
2021>, retrieved on Aug. 27, 2024, URL<https://www.o-ran.org/
blog/o-ran-alliance-introduces-33-new-specifications-released-since-
Mar. 2021>, 11 pages.

* cited by examiner

*Primary Examiner* — Adil Ocak
(74) *Attorney, Agent, or Firm* — Lowenstein Sandler LLP

(57) ABSTRACT

A computer-implemented method includes: monitoring reg-
istration messages in a radio access network (RAN) using a
RAN intelligent controller (RIC); based on monitoring the
registration messages, detecting a signaling storm condition
using the RIC; and based on detecting the signaling storm
condition, executing a mitigation policy using the RIC, the
mitigation policy altering treatment of incoming registration
messages by the RAN.

18 Claims, 6 Drawing Sheets

600

Monitor registration messages in a radio access network (RAN) using a RAN intelligent controller (RIC), the registration messages indicative of attempts by user equipment (UE) to register with the RAN
602

↓

Detect a signaling storm condition using the RIC
604

↓

Based on detecting the signaling storm condition, execute a mitigation policy using the RIC, the mitigation policy altering treatment of incoming registration messages by the RAN.
606

Registration message characteristics (206)

Network characteristics (208)

Implemented policy(ies) (214)

A1 Trained policy(ies) provided to near-real time RIC (212)

Registration messages (220)

E2

Control of roaming handling, filtering, throttling, etc (216)

Registration
message
characteristics
(206)

Registration
messages
(220)

Network
characteristics
(208)

A1

Notification to
near-real time
RIC
(406)

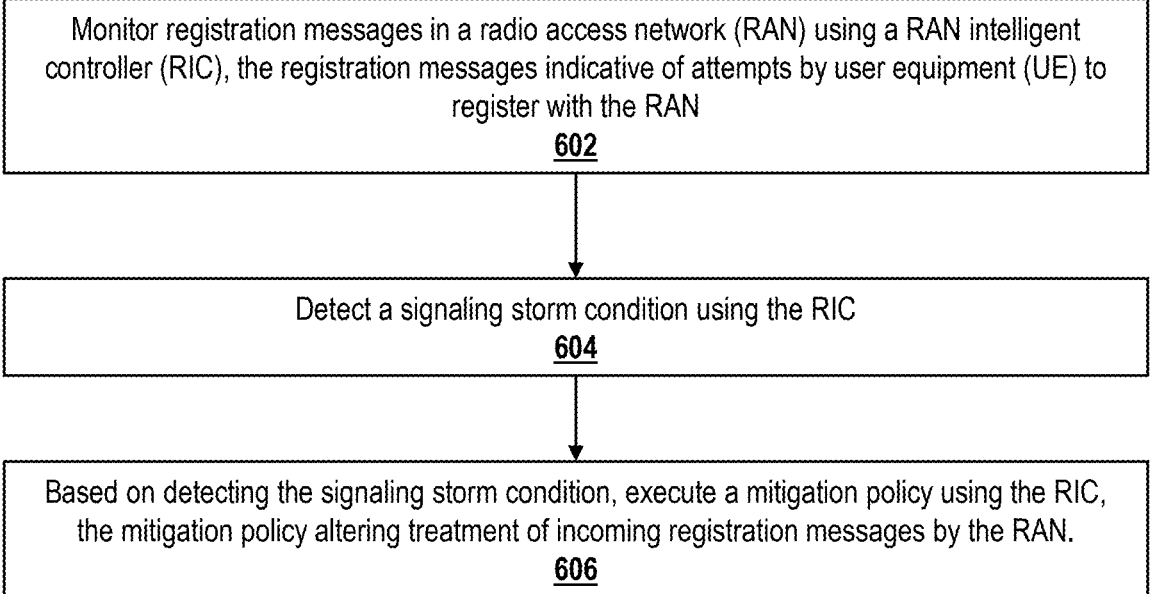

600

Monitor registration messages in a radio access network (RAN) using a RAN intelligent controller (RIC), the registration messages indicative of attempts by user equipment (UE) to register with the RAN
602

Detect a signaling storm condition using the RIC
604

Based on detecting the signaling storm condition, execute a mitigation policy using the RIC, the mitigation policy altering treatment of incoming registration messages by the RAN.
606

FIG. 6

SIGNALING STORM MITIGATION

TECHNICAL FIELD

This disclosure relates generally to management of wireless networks.

BACKGROUND

In a 5G Radio Access Network (RAN), registration of user equipment (UE) is performed using registration messages sent from UE to base stations (gNB) and from base stations to the 5G Core (5GC). In a 5G RAN, a RAN Intelligent Controller (RIC) is a module that monitors, controls, and/or optimizes, for example, various performance-related and traffic-related functionalities of the network. In an Open-RAN (O-RAN) system, the RIC can be a cloud-deployed module provided by a particular vendor or manufacturer and configured to execute a set of pre-approved set of applications.

SUMMARY

Some aspects of this disclosure describe a computer-implemented method. The method includes: monitoring registration messages in a radio access network (RAN) using a RAN intelligent controller (RIC), the registration messages indicative of attempts by user equipment (UE) to register with the RAN; detecting a signaling storm condition using the RIC; and, based on detecting the signaling storm condition, executing a mitigation policy using the RIC, the mitigation policy altering treatment of incoming registration messages by the RAN.

This and other methods described herein can have one or more of at least the following characteristics.

In some implementations, monitoring the registration messages includes monitoring an E2 interface of the RAN.

In some implementations, monitoring the registration messages is performed using a near-real-time application of the RIC.

In some implementations, detecting the signaling storm condition includes determining that a number of registration attempts in the RAN within a predetermined time period is above a threshold.

In some implementations, detecting the signaling storm condition includes detecting a number of duplicate registration messages in the registration messages.

In some implementations, executing the mitigation policy includes at least one of configuring roaming handling, filtering the incoming registration messages, or throttling the incoming registration messages.

In some implementations, executing the mitigation policy includes filtering-out registration messages from a type or model of user equipment.

In some implementations, executing the mitigation policy comprises executing a machine learning model to determine the mitigation policy.

In some implementations, the method includes updating the machine learning model using (i) data characterizing the registration messages, and (ii) network conditions associated with the registration messages.

In some implementations, the method includes obtaining the machine learning model at a near-real-time application of the RIC from a non-real-time application of the RIC through an A1 interface of the RAN.

In some implementations, the method includes detecting the signaling storm condition using a non-real time application of the RIC, and executing the mitigation policy using a near-real time application of the RIC.

The subject matter described in this specification can be implemented in particular implementations so as to realize one or more of at least the following advantages. In some implementations, based on using the E2 interface of a RAN, signaling storm detection and/or mitigation can be performed more quickly and/or more efficiently. In some implementations, based on detecting signaling storm conditions using registration messages, signaling storm attempts can be detected and mitigated more quickly (e.g., before the attempts have had their full effect on the RAN), e.g., because registration corresponds to initial contact between UE and the RAN, such that malicious UE can be prevented from further attacking the RAN after being registered. In some implementations, joint detection and mitigation using a near-real time RIC and a non-real time RIC can provide more efficient, dynamic, and/or effective detection and/or mitigation.

Methods described in this disclosure may be implemented at least using systems, devices (e.g., base stations and other network components), and non-transitory, computer-readable storage media. The details of the disclosed implementations are set forth in the accompanying drawings and the description below. Other features, objects, and benefits are apparent from the description, drawings, and claims.

DESCRIPTION OF DRAWINGS

FIG. 6 is a diagram illustrating an example of a process for signaling storm mitigation.

The same reference symbol used in various drawings indicates like elements.

DETAILED DESCRIPTION

Repetitive signaling in radio access networks (RANs), such as 5G networks, Open Radio Access Networks (O-RAN), and next-generation networks, can lead to "signaling storm," in which the volume of messages causes outages, breaches of protected information transmitted in the networks, and/or other overloads. For purposes of this disclosure, it has been recognized that signaling storm can be effectively mitigated based on monitoring registration messages in cellular networks. It has been further recognized that monitoring and policy generation using RAN intelligent controller (RIC) applications can facilitate integration of mitigation operations into networks and improve the efficacy of the mitigation. Described herein are methods, systems, and associated devices for mitigating signaling storm in the context of RANs.

Figure 1:
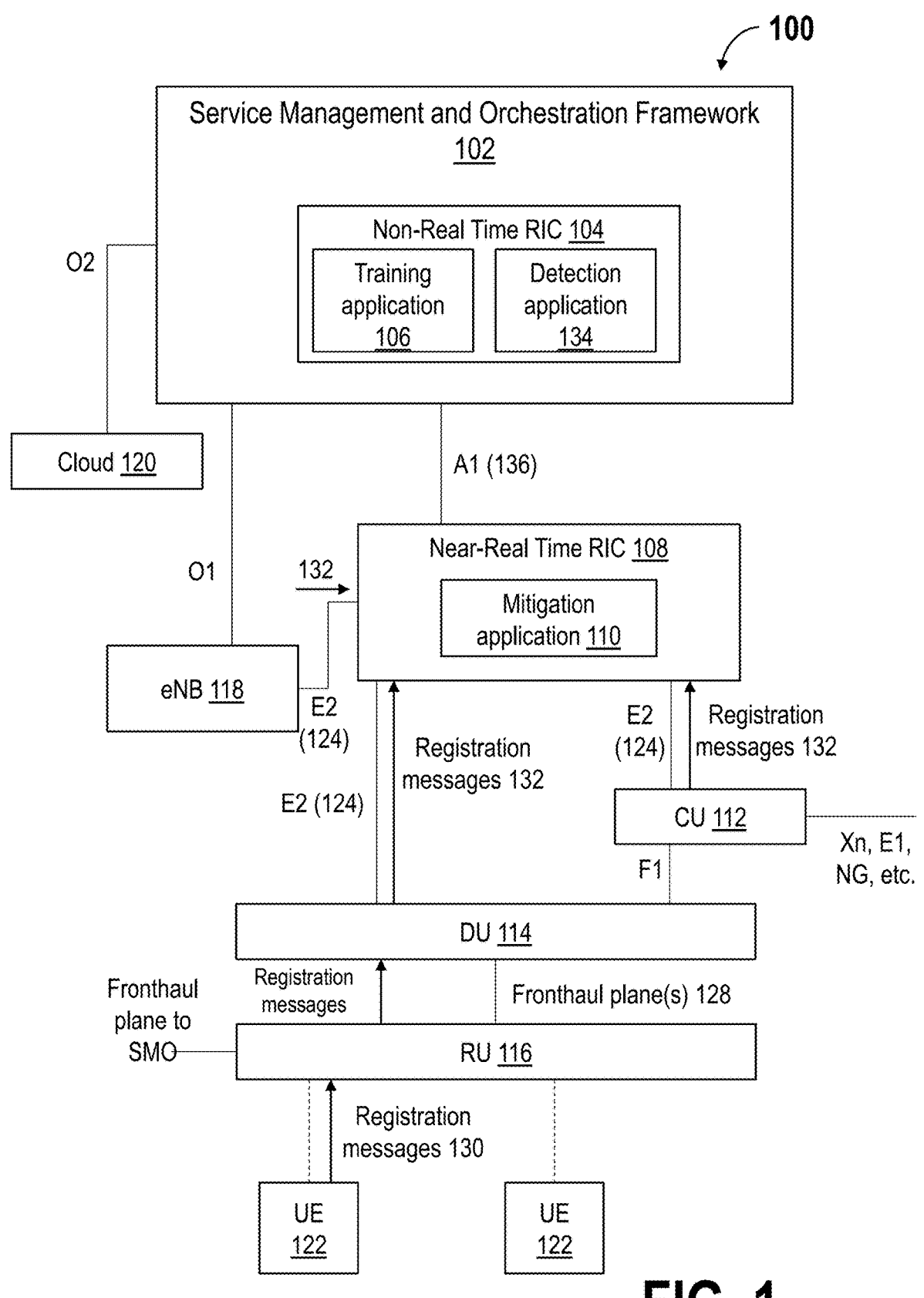
FIG. 1 is a diagram illustrating an example of a system of a radio access network (RAN).

FIG. 1 illustrates an example of a system 100 of a RAN. The system 100 can be, for example, an O-RAN architecture of a 5G network, but the scope of this disclosure is not limited thereto, and it will be understood that the processes, systems, and approaches described herein can be applied in other network types, such as next-generation (e.g., 6G) networks, non-O-RAN networks, etc.

The system 100 includes a service management and orchestration framework (SMO) 102, a RIC including a non-real time RIC 104 and a near-real time RIC 108, a central unit (CU) 112 (e.g., including an operations and control unit control plane (O-CU-CP)), a distributed unit (DU) 114, a cloud computing component 120, a base station (e.g., eNB 118), and a radio unit (RU) 116. The system 100 can handle data transmission with one or more UEs 122, for example, mobile devices such as smartphones, wearable devices, vehicles, etc.

Figure 3:
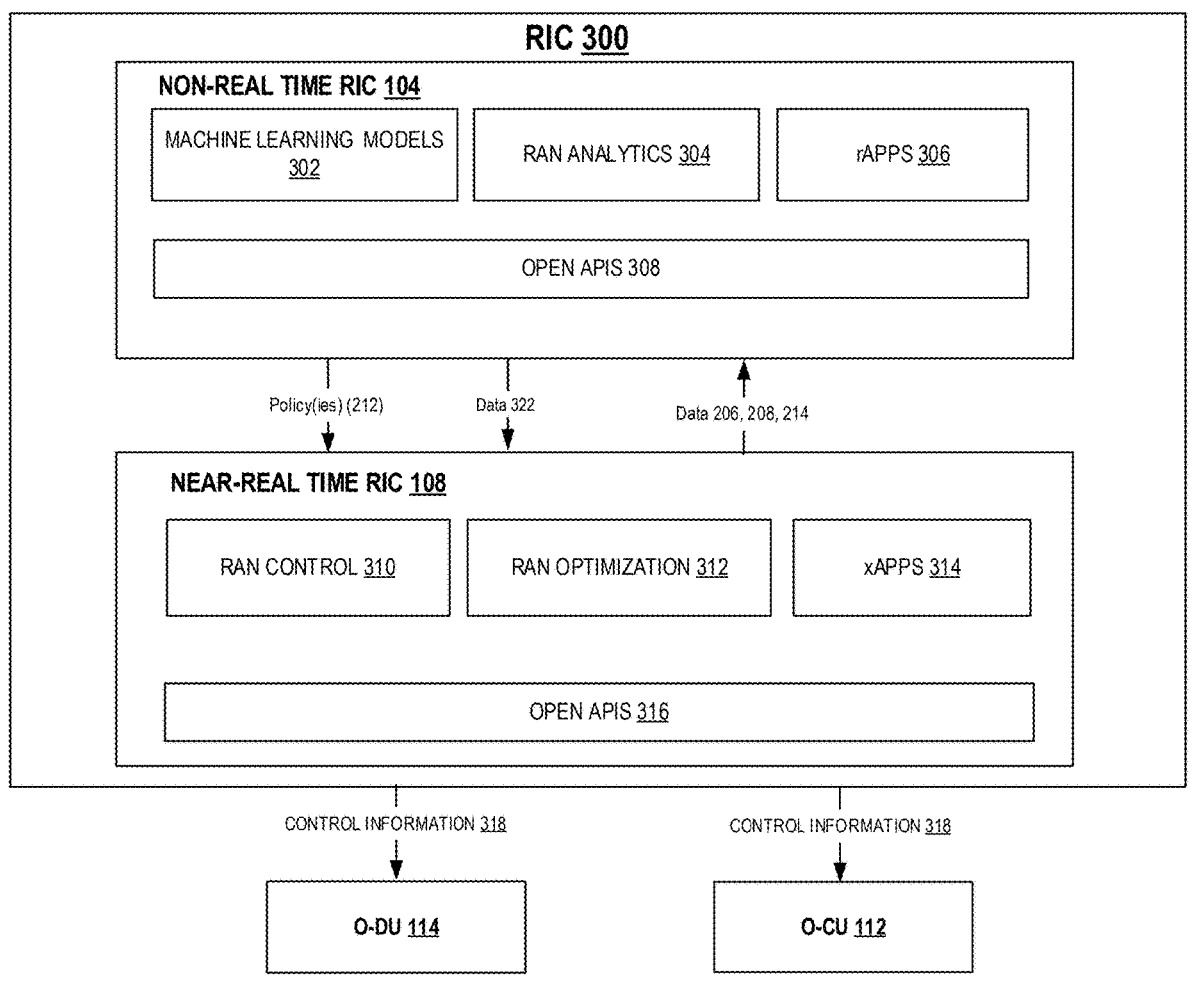
FIG. 3 is a diagram illustrating an example of a RIC.

The system 100 can implement, for example, an O-RAN network. FIG. 3 illustrates a portion of the system 100, including a RIC 300 that includes the non-real time RIC 104 and the near-real time RIC 108; the DU 114 (here shown as an O-DU in an ORAN system); and the CU 112 (here shown as an O-CU in an ORAN system). The non-real time RIC 104 is configured to perform non-real-time analysis of network conditions, registration messages, and/or other traffic by executing machine learning models 302, RAN analytics 304, and/or rApps 306. The rApps 306 can include the training application 106 described with respect to FIGS. 1 and 3, and/or the detection application 134 described with respect to FIG. 4A. The SMO 102 can execute the non-real time RIC 104 using one or more function calls (e.g., open APIs 308). The non-real time RIC 104 may have a longer latency than the near-real time RIC, e.g., with a latency of 1 second or longer.

The near-real time RIC 108 is configured to perform near real-time analysis of network conditions, registration messages, and/or other traffic during a communication session by executing RAN control 310, RAN optimization 312, and/or xApps 314. The xApps 314 can include the mitigation application 110 described with respect to FIGS. 1 and 3. The RAN control 310 and/or RAN optimization 312 can be executed to perform mitigation actions, e.g., as determined by policies of the mitigation application 110. Elements of the near-real time RIC 108 can be executed using one or more function calls (e.g., open APIs 316). The near-real time RIC 108 can respond to data with low latency, e.g., between 1 ms and 1 second. As discussed herein, the near-real time RIC 108 and the non-real time RIC 104 can advantageously operate in conjunction with one another to detect and mitigate signaling storm conditions, with the non-real time RIC 104 configured to, for example, gather data from RAN elements of the system 100 and provide data (e.g., signaling storm detections, policies, etc.) to the near-real time RIC 108, which mitigates the detected signaling storm.

The O-DU 114 and the O-CU 112 are configured to generate (e.g., prepare) data for transmission using the O-RAN/system 100, where the O-DU 114 is configured to prepare data for lower layer protocols and the O-CU 112 is configured to prepare data for higher layer protocols. For example, the O-DU 114 can structure data or information of physical layer protocols for the RIC 300 to provide to one or more other computing devices in the O-RAN/system 100. In some implementations, the O-CU 112 and/or the O-DU 114 can be virtualized, e.g., executed as modules in a cloud-computing environment.

As shown in FIG. 3, the non-real time RIC 104 and the near-real time RIC 108 can exchange data. For example, the non-real time RIC 104 can provide policies 212 generated or trained by the non-real time RIC 104 to the near-real time RIC 108, the policies 212 dictating detection and/or mitigation of signaling storm. The near-real time RIC 108 can provide data 208, 208, and/or 214 to the non-real time RIC 104. In some implementations, the non-real time RIC 104 can provide data 322 to the near-real time RIC 108, the data 322 indicative of detection of a signaling storm condition. The exchange of data is discussed in further detail with respect to FIGS. 2A-2B and 4A-4B below.

With respect to elements of the system 100 not shown in FIG. 3, the RU 116 can be located on the end of the system 100 and can connect to UE 122. For example, the RU 116 can include a physical antenna and can wirelessly connect to UE 122. The RU 116 can connect to DU 114 through fronthaul planes 128, e.g., to provide registration messages to the DU 114. In some implementations, the RU 116 can connect to the CU 112 through a midhaul interface. In some implementations, for example in 4G long term evolution (LTE) networks, the RU 116, DU 114, and/or CU 112 can be located between the UE 122 and an evolved packet core (EPC). The RU 116, DU 114, and/or CU 112 can be part of a base station (e.g., gNB or eNB 118). The cloud computing component 120 can represent one or more cloud computing systems that exchange data with the SMO 102 and/or other elements of the system 100. In some implementations, the cloud computing component 120 can implement one or more other elements of the system 100, such as the RIC 300 or a portion thereof, the DU 114, and/or the CU 112.

A mitigation application 110 executes in the near-real time RIC 108. For example, the mitigation application 110 can be an xApp, but is not limited thereto. The mitigation application 110 can be configured to monitor registration messages provided by the UE 122. Registration messages are provided by UE 122 that are not yet registered/authenticated in the RAN. Accordingly, they may constitute a first interaction between a given UE 122 and the RAN, such that mitigation of signaling storm based on registration messages can advantageously detect and counter malicious behavior as soon as possible in the UE/RAN interaction process. For example, in some cases, waiting until a later portion of the UE/RAN interaction process may allow malicious UE more opportunities to harm the RAN.

In an example of UE registration, a UE 122 can transmit a Non-Access-Stratum (NAS) registration message 130 including, for example, a registration type, UE capability, a Globally Unique Temporary Identity (GUTI), etc. The NAS message 130 can be received by the system 100, e.g., at the RU 116 at a base station, and provided to other components of the system 100 (e.g., the DU 114) by fronthaul planes 128. Within the system 100, registration messages can be transmitted/provided as NAS-Packet Data Unit (NAS-PDU) registration messages 132 that include data included in the NAS message 130, along with, in some implementations, additional data, such as location of the UE 122, establishment cause, temporary mobile subscriber identity (TMSI), etc.

The mitigation application 110 can monitor an E2 interface 124 of the system 100 to obtain the registration messages 132, for example, from the CU 112 and/or the DU 114. Based on the registration messages 132, the mitigation application 110 can detect a signaling storm condition indicative of an in-progress malicious attack on the system. For example, in some implementations, the signaling storm condition can be based on a number and/or rate of registration messages, e.g., that a number and/or rate of registration messages is above a threshold value. For example, the number and/or rate of registration messages can be a number of registration messages received within a predetermined time period. In some implementations, the signaling storm condition can be based on a number of repeat occurrences of individual/particular registration messages, e.g., a number of duplicate messages. In some implementations, the signaling storm condition can be based on characteristics of a set of UE 122 sending registration messages, e.g., that the set of UE 122 share a common device type, are unknown to the RAN, etc. In some implementations, the signaling storm condition can be detected using a trained machine learning model or policy, e.g., as discussed in further detail with respect to FIGS. 2A-2B. In some implementations, the signaling storm condition can be detected by a detection application 134 of the non-real time RIC 104, as discussed below in reference to FIGS. 4A-4B.

Duplicate messages can include messages corresponding to the same UE performing multiple registration attempts, and/or can include the same or similar malicious registration message sent by multiple UEs.

In some implementations, monitoring registration messages specifically by monitoring the E2 interface can be advantageous. For purposes of this disclosure, it has been recognized that, because the RIC (e.g., the near-real time RIC 108) interfaces directly with the CU 112 and the DU 114 via the E2 interface 124, the processes described herein for signaling storm detection and mitigation can be performed more quickly (e.g., with lower latency) and/or more efficiently (e.g., using fewer inter-system messages and/or fewer processing resources) than by using other components of the system 100 and/or other interfaces of the system 100.

Based on detecting the signaling storm condition, the mitigation application 110 can execute a mitigation policy. The mitigation policy (which can be, for example, a trained policy provided by the training application 106) alters treatment of incoming registration messages by the system 100. It will be understood that executing the mitigation policy can include altering treatment of registration messages by the near-real time RIC 108 that is executing the mitigation application 110, and/or can include causing one or more other components of the system 100 (such as the CU 112, the DU 114, the SMO 102, an Access and Mobility Management Function (AMF), Authentication Server Function (AUSF), and/or the like) to cause the other component(s) to alter their treatment of registration messages, e.g., by sending commands to the other component(s). For example, the near-real time RIC 108 can perform throttling, filtering, and/or the like on incoming registration messages, and/or can cause other component(s) to perform throttling, filtering, and/or the like.

For example, in some implementations, executing the mitigation policy results in global throttling of incoming registration messages in the system 100, e.g., to maintain a number of registration messages 132 below a defined upper limit. For example, at least some incoming registration messages can be discarded. In some implementations, executing the mitigation policy including discarding non-registration messages. Discarding can be handled directly by the mitigation application 110 and/or can be handled by a RAN core component (e.g., the 5GC) and/or an application of the non-real time RIC 104 based on execution of the mitigation application 110 (e.g., caused by the execution).

In some implementations, discarding can include discarding messages based on the messages originating from non-authenticated UEs, based on the messages having large sizes (e.g., large buffers), and/or based on the messages being repeats or duplicates of previous messages. For example, discarding can be based on identifiers associated with the messages, such as International Mobile Subscriber Identity (IMSI), Temporary Mobile Subscriber Identity (TMSI), and/or Mobile Station International Subscriber Directory Number (MSISDN). For example, the contents of a message (e.g., a registration message or authentication message) can be read, and the message can be discarded (filtered-out) based on a size of the message being larger than a previous message (e.g., a previous message corresponding to the same UE, or a previous registration message or authentication message serving a same function as the message). For example, the message can be discarded if its size is greater than the size of the previous message by a threshold amount.

In some implementations, executing the mitigation policy includes segregating incoming registration messages based on one or more characteristics of the registration messages, e.g., UE type. For example, the mitigation application 110 can determine that incoming registration messages from a particular type or model of UE are malicious (e.g., based on a number of those messages exceeding a threshold) and, in response, handle incoming registration messages from that type or model of UE differently from other incoming registration messages, e.g., discarding them or subjecting them to one or more further processing operations. For example, incoming registration messages from that type or model of UE can be filtered out. As another example, the type or model of UE can be removed from handling by the system 100, e.g., by setting the type or model of UE to be handled by a roaming service such that incoming registration messages from the type or model of UE are handled by another network.

For example, the most-numerous types of UE models using the system 100 can be tracked, e.g., by the non-real time RIC 104, the near-real time RIC 108, and/or another component of the system 100. For example, it can be determined that the most-common UE type using the system 100 for communication and/or sending registration messages is a first smartphone model or operating system, that the second most-common UE type using the system 100 for communication and/or sending registration messages is a second smartphone model or operating system, etc. The number of UEs can be a number of UEs using the system 100 within a time interval. Based on detection of the signaling storm condition, the n most-used UE types can be selectively filtered, throttled, and/or switched to a roaming service, where n is an integer greater than or equal to 1. Accordingly, in cases in which a signaling storm attempt uses particular UE types, the operations of those UE types in the system 100 can be restricted, mitigating the signaling storm.

Setting registration messages to be selectively handled by a roaming service (e.g., another carrier network instead of an initial carrier network) can, in some implementations, provide an efficient and effective response to signaling storm. Registration messages identified as potential signaling storm messages can be throttled (without being entirely discarded) by having the messages be routed to or otherwise handled by a roaming partner network, to allow processing of the messages without overloading the initial network, based on execution of the mitigation policy.

The type or model of UE can correspond to, for example, device model, device software version, and/or device firmware version.

As another example, incoming registration messages can be handled differently based on geography. For example, incoming registration messages from a particular geographic area can be filtered-out, e.g., throttled, discarded, and/or handled by a roaming service, based on execution of the mitigation policy.

For purposes of this disclosure, it has been recognized that, in some implementations, using the RIC for monitoring and/or mitigation can be particularly advantageous, e.g., as opposed to using a bridge mechanism. The RIC has access to various interfaces within the system 100, such that various components can be conveniently and efficiently accessed and/or queried to obtain data and/or adjust operations during signaling storm mitigation. For example, the E2 interface 124, the A1 interface 136, and other interfaces can be used for low-latency and efficient monitoring and communication within the system 100. Moreover, as discussed below, in some implementations, the RIC can advantageously employ an "intelligent," learning-based approach for at least some aspects of signaling storm mitigation and detection.

In some implementations, at least some operations of the mitigation application 110 can be learned in an artificial intelligence (AI)/machine learning (ML) process. For example, at least one of (i) detection of the signaling storm condition or (ii) the mitigation policy can be learned.

Figure 2A:
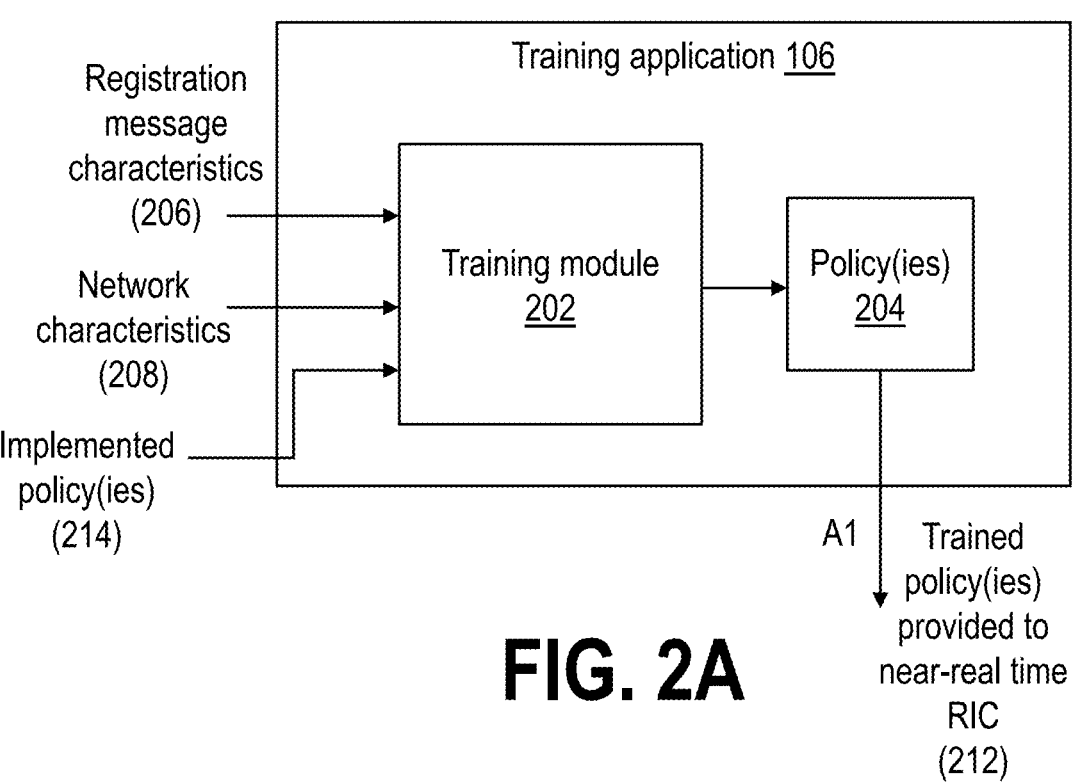
FIGS. 2A-2B are diagrams illustrating examples of applications.

In some implementations, as shown in FIG. 2A, learning/ training can be performed by a model training application 106 executing in the non-real time RIC 104. The model training application 106 can be, for example, an rApp, but is not limited thereto. The model training application 106 includes a training module 202, for example, a software module or a program. The training module 202 receives, as input, registration message characteristics 206 and network characteristics 208. The registration message characteristics 206 and network characteristics 208 can be provided, for example, over an A1 interface 136 (shown in FIG. 1) from the near-real time RIC 108, and/or over an O1 and/or O2 interface, e.g., from the cloud computing component 120 and/or the eNB 118.

The registration message characteristics 206 can include data of individual registration messages 130 and/or 132 (e.g., GUTI, UE location, etc.) and/or can include aggregate data characterizing sets of registration messages 130 and/or 132. For example, the aggregate data can include a number of registration messages sharing a common characteristic (e.g., UE location or range of locations, UE type or model, particular UE, etc.) that are received at the system 100 over a time interval. Accordingly, the aggregate data can indicate, for example, when a high number of similar registration messages are being received, which can be a sign of a malicious signaling storm attempt.

In some implementations, the training module 202 receives network characteristics 208. The network characteristics 208 can indicate a state of the system 100, e.g., a state of the RAN. For example, the network characteristics 208 can indicate whether the system 100 is becoming overloaded or experiencing congestion based on the registration messages characterized by the registration message characteristics 206. These and/or other network characteristics 208 can be indicative of a signaling storm condition.

In some implementations, the training module 202 receives data 214 characterizing one or more implemented signaling storm mitigation policies. For example, the data 214 can include which policies were implemented (e.g., filtering or throttling according to a certain location or UE type, etc.), when the policies were implemented, and/or results of implementation of the policies. The policies can be any of the policies implemented by the mitigation application 110 as described throughout this disclosure. In some implementations, the results of the policies are included in the network characteristics 208. The results of the policies can include, for example, one or more measures of effectiveness of the policies at mitigating signaling storm (e.g., effectiveness in filtering-out or throttling malicious messages, effectiveness in reducing congestion and/or overload, etc.).

Based on the registration message characteristics 206, the network characteristics 208, and/or the data 214 characterizing one or more implemented signaling storm mitigation policies, the training module 202 trains one or more machine learning models and/or policies 204 (hereinafter referred to as policies 204, with the understanding that policies 204 can include one or more trained machine learning models and/or other learned components). The policies 204 can be executed to (i) detect a signaling storm condition, (ii) mitigate a detected signaling storm condition, or both (i) and (ii). For example, the policies 204 can indicate a threshold number of registration messages (e.g., corresponding to a UE or UE model or type) that result in detection of a signaling storm condition, where the threshold number is learned by the training module 202 based on its inputs 206, 208, and/or 214. For example, based on the registration message characteristics 206 and the network characteristics 208, the training module 202 can learn what number and/or other characteristics of registration messages result in RAN congestion or overload, and the learned number and/or other characteristics can be set in the policies 204 as a signaling storm condition. Learned parameters of the policies 204 in relation to detection of signaling storm condition can be any of the parameters discussed above with respect to detection of signaling storm condition by the mitigation application 110.

With respect to learned policies 204 for signaling storm mitigation, based on the data 214 characterizing (previously-implemented) policies, and corresponding results of the policies (e.g., in the data 214 or the network characteristics 208), along with optionally, in some implementations, the registration message characteristics 206, the training module 202 can learn what mitigation operations are effective at mitigation, and can set those operations in the policies 204. The trained policies 204 can indicate the mitigation operations that are to be performed by the mitigation application 110 in response to characteristics of registration messages monitored by the mitigation application 110. For example, certain mitigation operations may be more effective at countering signaling storm attempts that are by certain types or models of UE, that are present in certain RAN network contexts (e.g., a number of non-malicious registrations occurring in the RAN), and/or that include certain numbers of malicious registration messages. For example, in response to a first number of malicious registration messages, the policies 204 can indicate that incoming registration messages are to be handled by a roaming service, and, in response to a second number of malicious registration messages (higher than the first number), the policies 204 can indicate that incoming registration messages are to be filtered/throttled, entirely or based on one or more characteristics of the registration messages. It will be understood that various other aspects of signaling storm detection and/or mitigation can be learned, without departing from the scope of this disclosure.

Figure 2B:
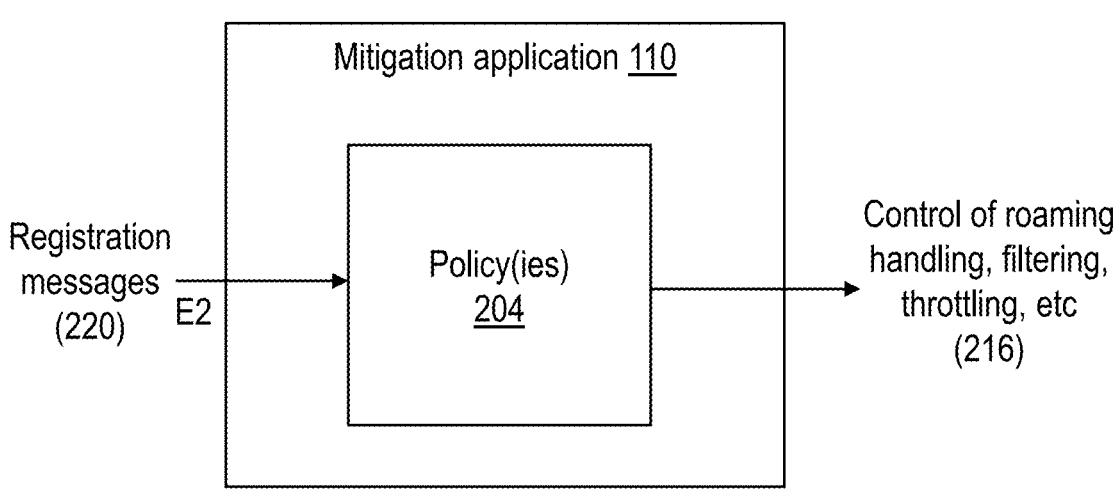

As shown in FIGS. 1 and 2A, the trained policies 204 can be provided (212) by the training application 106 of the non-real time RIC 104 to the mitigation application 110 of the near-real time RIC 108, e.g., over an A1 interface 136. Accordingly, the trained policies 204 can be used by the training application 106 for signaling storm detection and/or mitigation. For example, as shown in FIG. 2B, the mitigation application 110 can provide registration messages 220 (e.g., messages 130 and/or 132) as input to the policies 204 by monitoring the E2 interface. The mitigation application 110 can execute the policies 204 and perform mitigation operations 216 based on the policies 204, e.g., as outputs of the policies 204. For example, the mitigation application 110 can control roaming handling, initiate or adjust filtering, initiate or adjusting throttling, etc., based on execution of the trained policies 204.

Further, in some implementations, the policies 204 can be updated (retrained) based on feedback between the mitigation application 110 and the training application 106. For example, in some implementations, the mitigation application 110 can perform signaling storm mitigation based on the policies, and the results of the mitigation can be provided as data 214 to the training module 202. In some implementations, characteristics of the registration messages 220 based on which the mitigation application 110 performs mitigation (and/or characteristics of incoming registration messages on which the mitigation application 110 performs mitigation) can be provided as registration message characteristics 206 to the training module 202. In some implementations, network characteristics of the system 100 before, during, and/or after execution of the policies 204 by the mitigation application 110 can be provided as network characteristics 208 to the training module 202.

Based on the provided data, the training module 202 can update the policies 204 to be more effective (e.g., to more effectively detect and/or mitigate signaling storm), and the updated policies can be provided to the mitigation application 110 for use. Accordingly, the non-real time RIC 104 and the near-real time RIC 108 can work together to reduce or prevent signaling storm in an iterative, RIC-based process integrated directly into the RAN of the system 100.

As another example of joint operation by the non-real time RIC 104 and the near-real time RIC 108, in some implementations, the non-real time RIC 104 optionally includes a detection application 134. The detection application 134 (e.g., an rApp) can be configured to detect signaling storm conditions, e.g., by monitoring incoming registration messages, and an xApp such as the mitigation application 110 can execute/enforce policies to mitigate signaling storm attempts.

Figure 4A:
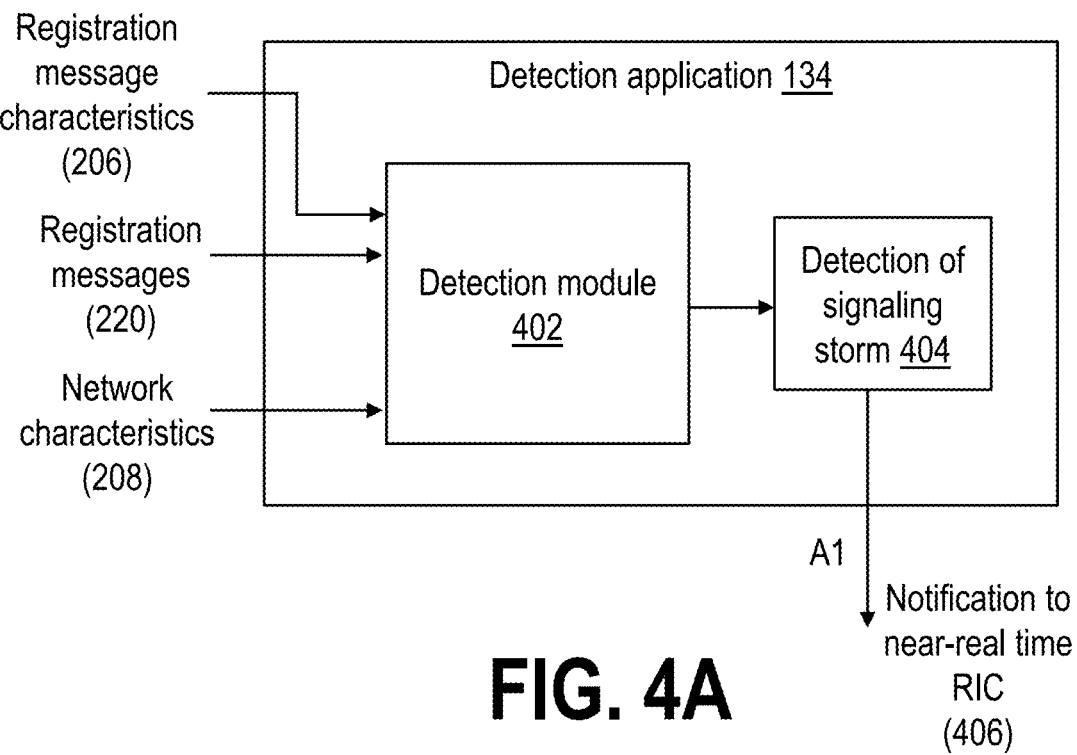
FIGS. 4A-4B are diagrams illustrating examples of applications.

For example, as shown in FIG. 4A, the detection application 134 (which can be the same rApp or a different rApp from the training application 106) can include a detection module 402. The detection module 402 can monitor the incoming registration messages 220, e.g., as described above with respect to the mitigation application 110 monitoring the E2 interface 124. For example, the detection module 402 can monitor the A1 interface 136, or another interface, to obtain the registration messages 220 and/or network characteristics 208. For example, the registration messages 220 can be monitored by the near-real time RIC 108 using the E2 interface, and the registration messages 220 and/or characteristics/descriptors thereof (e.g., registration message characteristics 206) can be provided from the near-real time RIC 108 to the non-real time RIC 104. In some implementations, the near-real time RIC 108 can determine the registration message characteristics 206 and/or the network characteristics 208 and can provide the characteristics 206 and/or 208 to the non-real time RIC 104, e.g., over the A1 interface.

Based on the registration messages 220, the registration message characteristics 206, and/or the network characteristics 208, the detection module 402 can detect a signaling storm condition (404). For example, as discussed above, the detection module 402 can determine that a number and/or rate of registration messages 220 (e.g., received within a predetermined time period) is above a threshold, can detect a number of duplicate registration messages 220 (e.g., determine that the number of duplicates is above a threshold), or can otherwise determine, based on the registration messages 220, that a malicious signaling storm attempt is in-progress.

In some implementations, the detection module 402 detects the signaling storm condition based on predetermined thresholds and/or other criteria. In some implementations, the detection module 402 executes a trained policy, such as a policy 204 discussed with respect to FIGS. 2A-2B. The policy 204 can be trained by the training application 106 as discussed with respect to FIG. 2A, and, as a result of the training, the policy 204 can be configured to detect signaling storm conditions. The detection application 134 can perform the detection functions discussed above as being performed by the mitigation application 110, instead of or in addition to the mitigation application 110.

Figure 4B:
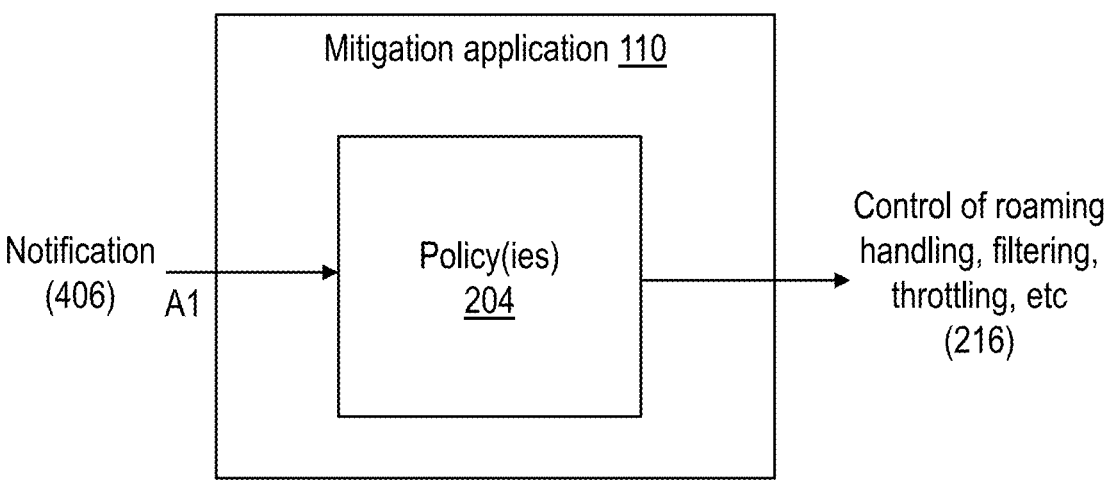

Based on detection of a signaling storm condition (404), the detection application 134 can provide/transmit a notification (406) to the mitigation application 110, e.g., over the A1 interface. As shown in FIG. 4B, the mitigation application 110 can receive the notification 406 and, based on receiving the notification 406, execute one or more policies 204 to mitigate the signaling storm (216), e.g., by controlling handling of incoming registration messages as discussed above.

FIG. 6 illustrates an example of a process 600 that can be performed according to some implementations of the present disclosure. The process 600 can be performed by a RIC such as a RIC including the non-real time RIC 104 and the near-real time RIC 108, and/or the RIC 300. For example, the process 600 can be performed by one or more rApps and/or xApps.

Any suitable architecture can be used for trained model(s) of the RIC applications, e.g., the policies 204, any model(s) applied by the detection application 134, etc. For example, the models can include any one or more suitable types of machine learning network and/or parametric function, including neural network(s), e.g., convolutional neural networks, recurrent neural networks, feedforward neural networks, perceptron networks, deep neural networks, etc. Further examples of the machine learning models include classification models, large language models, and regression models. The machine learning models can be trained/retrained based on supervised, semi-supervised, unsupervised and/or reinforcement learning. The machine learning models can be configured with one or more approaches, such as back-propagation, gradient boosted trees, decision trees, support vector machines, reinforcement learning, partially observable Markov decision processes (POMDP), and/or table-based approximation, to provide several non-limiting examples. Based on the type of the machine learning models, training can include adjustment of one or more parameters. For example, in the case of a regression-based model, the training can include adjusting one or more coefficients of the regression so as to minimize a loss function such as a least-squares loss function. In the case of a neural network, the training can include adjusting weights, biases, number of epochs, batch size, number of layers, and/or number of nodes in each layer of the neural network, so as to minimize a loss function. The machine learning models can include a single network/model/function or can include two, three, or more networks that together are trained to provide outputs. When the machine learning model includes two or more networks, inputs/outputs of the networks can be entirely distinct/independent, and/or an output of one network can be provided as input to another network, without departing from the scope of this disclosure.

As shown in FIG. 6, in the process 600, registration messages in a RAN are monitored using a RIC (602). The registration messages are indicative of attempts by UE to register with the RAN. For example, the registration messages can be monitored by monitoring an E2 interface of the RAN, e.g., by a near-real time RIC, as discussed in reference to FIGS. 1 and 3. In some implementations, the registration messages and/or characteristics thereof are provided (e.g., by the near-real time RIC) to a non-real time RIC that performs signaling storm detection, e.g., as described in reference to FIGS. 4A-4B.

A signaling storm condition is detected using the RIC (604), e.g., based on the monitoring of the registration messages using the RIC (602). For example, the signaling storm condition can be detected by the near-real time RIC or by the non-real time RIC. The signaling storm condition can be detected, for example, based on a number and/or rate of registration messages, such as total registration messages, registration messages satisfying a criteria, and/or duplicate registration messages.

Based on detecting the signaling storm condition, a mitigation policy is executed using the RIC (606). The mitigation policy alters treatment of incoming registration messages by the RAN. The mitigation policy can be executed, for example, by an application of the near-real time RIC. The mitigation policy can include and/or cause one or more RAN actions, such as registration message throttling, registration message filtering, and/or modified roaming handling for registration messages. In some implementations, the mitigation policy can be a trained policy, e.g., a policy trained by the non-real time RIC. For example, the mitigation policy can be obtained as described with respect to FIGS. 2A-2B.

Figure 5:
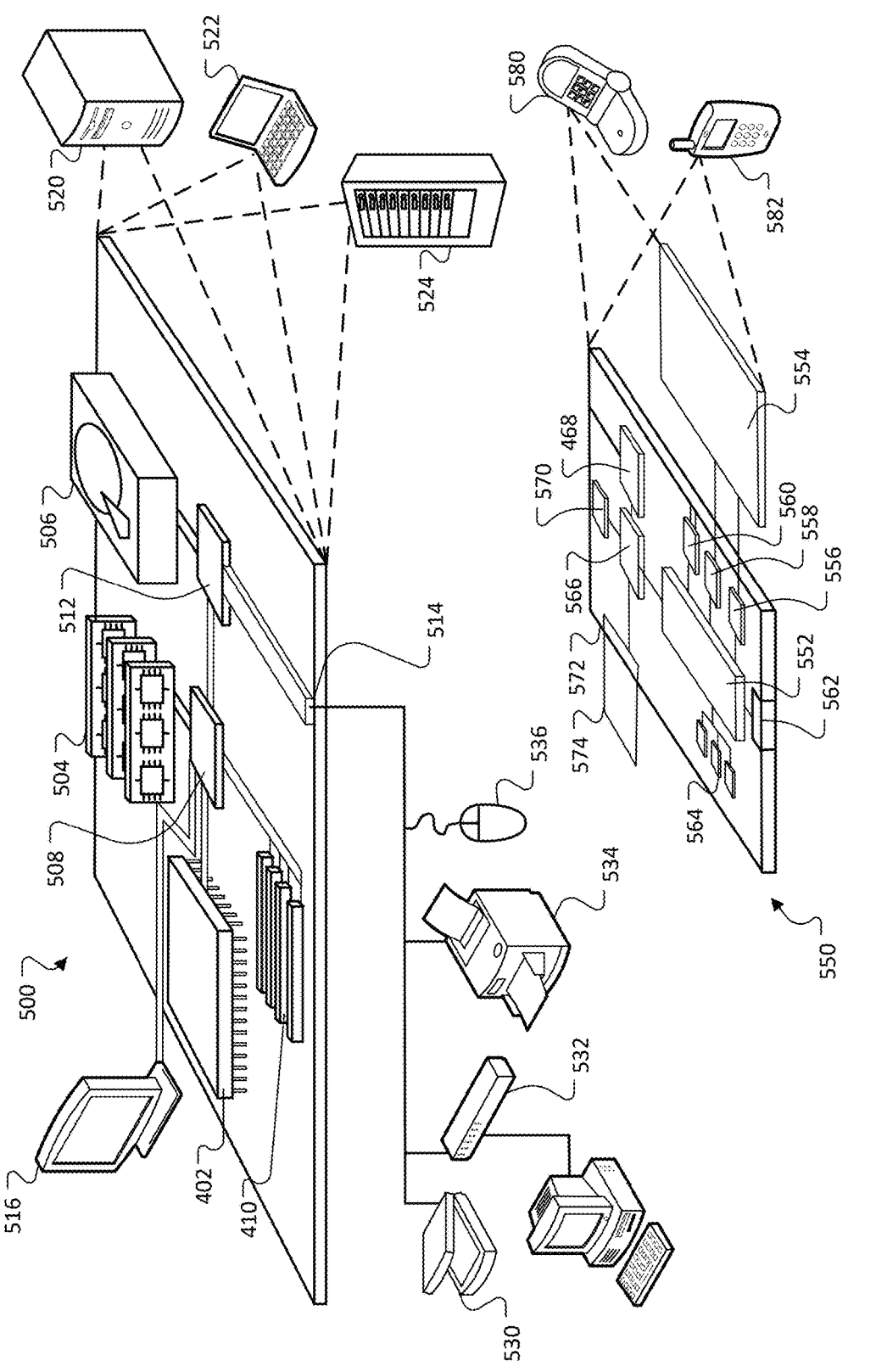
FIG. 5 is a diagram of a computing system that can be used in connection with computer-implemented methods described herein.

FIG. 5 shows an example of a computing device 500 and a mobile computing device 550 (also referred to herein as a wireless device) that are employed to execute implementations of the present disclosure. The computing device 500 is intended to represent various forms of digital computers, such as laptops, desktops, workstations, personal digital assistants, servers, blade servers, mainframes, and other appropriate computers. The mobile computing device 550 is intended to represent various forms of mobile devices and UE, such as personal digital assistants, cellular telephones, smart-phones, AR devices, and other similar computing devices. The components shown here, their connections and relationships, and their functions, are meant to be examples only, and are not meant to be limiting. The computing device 500 and/or the mobile computing device 550 can form at least a portion of the systems and modules described above. For example, a computing device 500, or a portion thereof, can be used to implement the RIC 300. The UE 122 described with reference to FIG. 1 can be substantially similar to the mobile computing device 550.

The computing device 500 includes a processor 502, a memory 504, a storage device 506, a high-speed interface 508, and a low-speed interface 512. In some implementations, the high-speed interface 508 connects to the memory 504 and multiple high-speed expansion ports 510. In some implementations, the low-speed interface 512 connects to a low-speed expansion port 514 and the storage device 506. Each of the processor 502, the memory 504, the storage device 506, the high-speed interface 508, the high-speed expansion ports 510, and the low-speed interface 512, are interconnected using various buses, and may be mounted on a common motherboard or in other manners as appropriate. The processor 502 can process instructions for execution within the computing device 500, including instructions stored in the memory 504 and/or on the storage device 506 to display graphical information for a graphical user interface (GUI) on an external input/output device, such as a display 516 coupled to the high-speed interface 508. In other implementations, multiple processors and/or multiple buses may be used, as appropriate, along with multiple memories and types of memory. In addition, multiple computing devices may be connected, with each device providing portions of the necessary operations (e.g., as a server bank, a group of blade servers, or a multi-processor system).

The memory 504 stores information within the computing device 500. In some implementations, the memory 504 is a volatile memory unit or units. In some implementations, the memory 504 is a non-volatile memory unit or units. The memory 504 may also be another form of a computer-readable medium, such as a magnetic or optical disk.

The storage device 506 is capable of providing mass storage for the computing device 500. In some implementations, the storage device 506 may be or include a computer-readable medium, such as a floppy disk device, a hard disk device, an optical disk device, a tape device, a flash memory, or other similar solid-state memory device, or an array of devices, including devices in a storage area network or other configurations. Instructions can be stored in an information carrier. The instructions, when executed by one or more processing devices, such as processor 502, perform one or more methods, such as those described above. The instructions can also be stored by one or more storage devices, such as computer-readable or machine-readable mediums, such as the memory 504, the storage device 506, or memory on the processor 502.

The high-speed interface 508 manages bandwidth-intensive operations for the computing device 500, while the low-speed interface 512 manages lower bandwidth-intensive operations. Such allocation of functions is an example only. In some implementations, the high-speed interface 508 is coupled to the memory 504, the display 516 (e.g., through a graphics processor or accelerator), and to the high-speed expansion ports 510, which may accept various expansion cards. In the implementation, the low-speed interface 512 is coupled to the storage device 506 and the low-speed expansion port 514. The low-speed expansion port 514, which may include various communication ports (e.g., Universal Serial Bus (USB), Bluetooth, Ethernet, wireless Ethernet) may be coupled to one or more input/output devices. Such input/output devices may include a scanner, a printing device, or a keyboard or mouse. The input/output devices may also be coupled to the low-speed expansion port 514 through a network adapter. Such network input/output devices may include, for example, a switch or router.

The computing device 500 may be implemented in a number of different forms, as shown in the FIG. 5. For example, it may be implemented as a standard server 520, or multiple times in a group of such servers. In addition, it may be implemented in a personal computer such as a laptop computer 522. It may also be implemented as part of a rack server system 524. Alternatively, components from the computing device 500 may be combined with other components in a mobile device, such as a mobile computing device 550. Each of such devices may contain one or more of the computing device 500 and the mobile computing device 550, and an entire system may be made up of multiple computing devices communicating with each other.

The mobile computing device 550 includes a processor 552; a memory 564; an input/output device, such as a display 554; a communication interface 566; and a transceiver 568; among other components. The mobile computing device 550 may also be provided with a storage device, such as a micro-drive or other device, to provide additional storage. Each of the processor 552, the memory 564, the display 554, the communication interface 566, and the transceiver 568, are interconnected using various buses, and several of the components may be mounted on a common motherboard or in other manners as appropriate. In some implementations, the mobile computing device 550 may include a camera device(s) (not shown).

The processor 552 can execute instructions within the mobile computing device 550, including instructions stored in the memory 564. The processor 552 may be implemented as a chipset of chips that include separate and multiple analog and digital processors. For example, the processor 552 may be a Complex Instruction Set Computers (CISC) processor, a Reduced Instruction Set Computer (RISC) processor, or a Minimal Instruction Set Computer (MISC) processor. The processor 552 may provide, for example, for coordination of the other components of the mobile computing device 550, such as control of user interfaces (UIs), applications run by the mobile computing device 550, and/or wireless communication by the mobile computing device 550.

The processor 552 may communicate with a user through a control interface 558 and a display interface 556 coupled to the display 554. The display 554 may be, for example, a Thin-Film-Transistor Liquid Crystal Display (TFT) display, an Organic Light Emitting Diode (OLED) display, or other appropriate display technology. The display interface 556 may include appropriate circuitry for driving the display 554 to present graphical and other information to a user. The control interface 558 may receive commands from a user and convert them for submission to the processor 552. In addition, an external interface 562 may provide communication with the processor 552, so as to enable near area communication of the mobile computing device 550 with other devices. The external interface 562 may provide, for example, for wired communication in some implementations, or for wireless communication in other implementations, and multiple interfaces may also be used.

The memory 564 stores information within the mobile computing device 550. The memory 564 can be implemented as one or more of a computer-readable medium or media, a volatile memory unit or units, or a non-volatile memory unit or units. An expansion memory 574 may also be provided and connected to the mobile computing device 550 through an expansion interface 572, which may include, for example, a Single in Line Memory Module (SIMM) card interface. The expansion memory 574 may provide extra storage space for the mobile computing device 550, or may also store applications or other information for the mobile computing device 550. Specifically, the expansion memory 574 may include instructions to carry out or supplement the processes described above, and may include secure information also. Thus, for example, the expansion memory 574 may be provided as a security module for the mobile computing device 550, and may be programmed with instructions that permit secure use of the mobile computing device 550. In addition, secure applications may be provided via the SIMM cards, along with additional information, such as placing identifying information on the SIMM card in a non-hackable manner.

The memory may include, for example, flash memory and/or non-volatile random access memory (NVRAM), as discussed below. In some implementations, instructions are stored in an information carrier. The instructions, when executed by one or more processing devices, such as processor 552, perform one or more methods, such as those described above. The instructions can also be stored by one or more storage devices, such as one or more computer-readable or machine-readable mediums, such as the memory 564, the expansion memory 574, or memory on the processor 552. In some implementations, the instructions can be received in a propagated signal, such as, over the transceiver 568 or the external interface 562.

The mobile computing device 550 may communicate wirelessly through the communication interface 566, which may include digital signal processing circuitry where necessary. The communication interface 566 may provide for communications under various modes or protocols, such as Global System for Mobile communications (GSM) voice calls, Short Message Service (SMS), Enhanced Messaging Service (EMS), Multimedia Messaging Service (MMS) messaging, code division multiple access (CDMA), time division multiple access (TDMA), Personal Digital Cellular (PDC), Wideband Code Division Multiple Access (WCDMA), CDMA2000, General Packet Radio Service (GPRS). Such communication may occur, for example, through the transceiver 568 using a radio frequency. In addition, short-range communication, such as using a Bluetooth or Wi-Fi, may occur. In addition, a Global Positioning System (GPS) receiver module 570 may provide additional navigation- and location-related wireless data to the mobile computing device 550, which may be used as appropriate by applications running on the mobile computing device 550.

The mobile computing device 550 may also communicate audibly using an audio codec 560, which may receive spoken information from a user and convert it to usable digital information. The audio codec 560 may likewise generate audible sound for a user, such as through a speaker, e.g., in a handset of the mobile computing device 550. Such sound may include sound from voice telephone calls, may include recorded sound (e.g., voice messages, music files, etc.) and may also include sound generated by applications operating on the mobile computing device 550.

The mobile computing device 550 may be implemented in a number of different forms, as shown in FIG. 5. For example, the mobile computing device 550 may include a phone device 582 or a tablet device 584. The mobile computing device 550 may also be implemented as a component of a smart-phone, personal digital assistant, AR device, or other similar mobile device.

Computing device 500 and/or 550 can also include USB flash drives. The USB flash drives may store operating systems and other applications. The USB flash drives can include input/output components, such as a wireless transmitter or USB connector that may be inserted into a USB port of another computing device.

Some features described with respect to FIGS. 1-5, such as the elements and modules of the system 100, the RIC 300, and the applications 106, 110, may be implemented in digital and/or analog electronic circuitry or in computer hardware, firmware, software, or in combinations of them. Some features may be implemented in a computer program product tangibly embodied in an information carrier, e.g., in a machine-readable storage device, for execution by a programmable processor. Method steps may be performed by a programmable processor executing a program of instructions to perform functions of the described implementations by operating on input data and generating output, by discrete circuitry performing analog and/or digital circuit operations, or by a combination thereof.

Some described features may be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that may be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random-access memory or both. The essential elements of a computer are a processor for executing instructions and one or more memories for storing instructions and data. Generally, a computer may communicate with mass storage devices for storing data files. These mass storage devices may include magnetic disks, such as internal hard disks and removable disks; magneto-optical disks; and optical disks. Storage devices suitable for tangibly embodying computer program instructions and data include all forms of non-volatile memory, including by way of example, semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits). To provide for interaction with a user the features may be implemented on a computer having a display device such as a CRT (cathode ray tube), LED (light emitting diode) or LCD (liquid crystal display) display or monitor for displaying information to the author, a keyboard and a pointing device, such as a mouse or a trackball by which the author may provide input to the computer.

A number of implementations have been described. Nevertheless, it will be understood that various modifications may be made. For example, in some implementations, instead of, or in addition to, monitoring registration messages and mitigation signaling storm by altering treatment of registration messages, one or more other RAN message types can be used. For example, in some implementations, signaling messages and/or radio resource control (RRC) messages, such as UE capability messages, can be used. These other message type(s) can be processed in the same way described above for registration messages. It will be understood that other message types may be obtained, transferred, and/or processed through the same and/or other interfaces and RAN components as described for the registration messages.

In addition, elements of one or more implementations may be combined, deleted, modified, or supplemented to form further implementations. In yet another example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A computer-implemented method, comprising:
monitoring registration messages in a radio access network (RAN) using a RAN intelligent controller (RIC), the registration messages indicative of attempts by user equipment (UE) to register with the RAN;
detecting a signaling storm condition using the RIC; and
based on detecting the signaling storm condition, executing a mitigation policy using the RIC, the mitigation policy altering treatment of incoming registration messages by the RAN,
wherein detecting the signaling storm condition comprises determining that a number of registration attempts in the RAN within a predetermined time period is above a threshold.

2. The computer-implemented method of claim 1, wherein monitoring the registration messages comprises monitoring an E2 interface of the RAN.

3. The computer-implemented method of claim 1, wherein monitoring the registration messages is performed using a near-real-time application of the RIC.

4. The computer-implemented method of claim 1, wherein detecting the signaling storm condition comprises detecting a number of duplicate registration messages in the registration messages.

5. The computer-implemented method of claim 1, wherein executing the mitigation policy comprises at least one of configuring roaming handling, filtering the incoming registration messages, or throttling the incoming registration messages.

6. The computer-implemented method of claim 5, wherein executing the mitigation policy comprises filtering-out registration messages from a type or model of user equipment.

7. The computer-implemented method of claim 1, wherein executing the mitigation policy comprises executing a machine learning model to determine the mitigation policy.

8. The computer-implemented method of claim 7, comprising updating the machine learning model using (i) data characterizing the registration messages, and (ii) network conditions associated with the registration messages.

9. The computer-implemented method of claim 7, comprising obtaining the machine learning model at a near-real-time application of the RIC from a non-real-time application of the RIC through an A1 interface of the RAN.

10. The computer-implemented method of claim 1, comprising detecting the signaling storm condition using a non-real-time application of the RIC, and
executing the mitigation policy using a near-real-time application of the RIC.

11. The computer-implemented method of claim 1, wherein the RAN comprises an Open RAN (ORAN) network.

12. A system comprising:
one or more processing devices; and
one or more storage devices storing instructions that, when executed by the one or more processing devices, cause the one or more processing devices to perform operations comprising:
monitoring registration messages in a radio access network (RAN) using a RAN intelligent controller (RIC), the registration messages indicative of attempts by user equipment (UE) to register with the RAN;
detecting a signaling storm condition using the RIC; and based on detecting the signaling storm condition, executing a mitigation policy using the RIC, the mitigation policy altering treatment of incoming registration messages by the RAN, wherein detecting the signaling storm condition comprises determining that a number of registration attempts in the RAN within a predetermined time period is above a threshold.

13. The system of claim 12, wherein monitoring the registration messages comprises monitoring an E2 interface of the RAN.

14. The system of claim 12, wherein monitoring the registration messages is performed using a near-real-time application of the RIC.

15. The system of claim 12, wherein detecting the signaling storm condition comprises detecting a number of duplicate registration messages in the registration messages.

16. The system of claim 12, wherein executing the mitigation policy comprises at least one of configuring roaming handling, filtering the incoming registration messages, or throttling the incoming registration messages.

17. The system of claim 12, comprising detecting the signaling storm condition using a non-real-time application of the RIC, and executing the mitigation policy using a near-real-time application of the RIC.

18. One or more non-transitory computer-readable storage media encoded with computer program instructions that, when executed by one or more computers, cause the one or more computers to perform operations comprising:

monitoring registration messages in a radio access network (RAN) using a RAN intelligent controller (RIC), the registration messages indicative of attempts by user equipment (UE) to register with the RAN;

detecting a signaling storm condition using the RIC; and based on detecting the signaling storm condition, executing a mitigation policy using the RIC, the mitigation policy altering treatment of incoming registration messages by the RAN, wherein detecting the signaling storm condition comprises determining that a number of registration attempts in the RAN within a predetermined time period is above a threshold.

\* \* \* \* \*